(12) United States Patent
Spindelbalker et al.

(10) Patent No.: US 11,378,823 B2
(45) Date of Patent: Jul. 5, 2022

(54) OPTICAL FILTER FOR SUNGLASSES

(71) Applicant: Silhouette International Schmied AG, Linz (AT)

(72) Inventors: Rupert Spindelbalker, Puchenau (AT); Karin Toni Bigel, Jr., Munich (DE); Marie-Christiane Nammour, Saint Claude (FR); Kévin Anh Quoc Le Quang, Saint Claude (FR)

(73) Assignee: Silhouette International Schmied AG, Linz (AT)

( * ) Notice: Subject to any disclaimer, the term of this patent is extended or adjusted under 35 U.S.C. 154(b) by 296 days.

(21) Appl. No.: 16/652,462

(22) PCT Filed: Jun. 21, 2019

(86) PCT No.: PCT/AT2019/060206
§ 371 (c)(1),
(2) Date: Mar. 31, 2020

(87) PCT Pub. No.: WO2020/000006
PCT Pub. Date: Jan. 2, 2020

(65) Prior Publication Data
US 2020/0285079 A1  Sep. 10, 2020

(30) Foreign Application Priority Data

Jun. 25, 2018 (AT) .............................. A 50521/2018

(51) Int. Cl.
*G02C 7/10* (2006.01)
(52) U.S. Cl.
CPC ............. *G02C 7/107* (2013.01); *G02C 7/104* (2013.01)

(58) Field of Classification Search
CPC .......... G02C 7/107; G02C 7/104; G02C 7/10; G02B 5/20
USPC ...................... 351/41, 159.01, 159.6, 159.62
See application file for complete search history.

(56) References Cited

U.S. PATENT DOCUMENTS

| | | | |
|---|---|---|---|
| 9,740,028 B1 * | 8/2017 | Larson | ................... G02B 5/208 |
| 10,168,553 B2 | 1/2019 | Larson | |
| 10,571,720 B2 * | 2/2020 | Larson | ................... G02C 7/104 |
| 2017/0299895 A1 | 10/2017 | Larson | |

FOREIGN PATENT DOCUMENTS

| | | |
|---|---|---|
| DE | 35 20 346 A1 | 12/1986 |
| DE | 698 39 286 T2 | 4/2009 |
| DE | 10 2013 106 201 A1 | 12/2014 |
| DE | 10 2015 117 540 A1 | 4/2016 |

(Continued)

*Primary Examiner* — Tuyen Tra
(74) *Attorney, Agent, or Firm* — Muirhead and Saturnelli, LLC

(57) ABSTRACT

In an optical filter for sunglasses, having a transmittance of less than 20% for light wavelengths from 400 nm to 650 nm, the transmission spectrum comprises a local transmission maximum in each of the light wavelength ranges between 440 nm and 470 nm and also between 570 nm and 590 nm and a local transmission maximum in the light wavelength range between 600 nm and 620 nm, wherein the transmittance below the connecting line of the local transmission maximum between 440 nm and 470 nm and the local transmission maximum between 570 nm and 590 nm has an essentially convex overall curve with a breadth of variation less than 8%.

17 Claims, 1 Drawing Sheet

(56) References Cited

FOREIGN PATENT DOCUMENTS

| EP | 0 855 602 A2 | 7/1998 |
| EP | 2 946 245 A1 | 11/2015 |
| EP | 2 946 245 B1 | 11/2017 |
| WO | WO 2014/111099 A1 | 7/2014 |

* cited by examiner

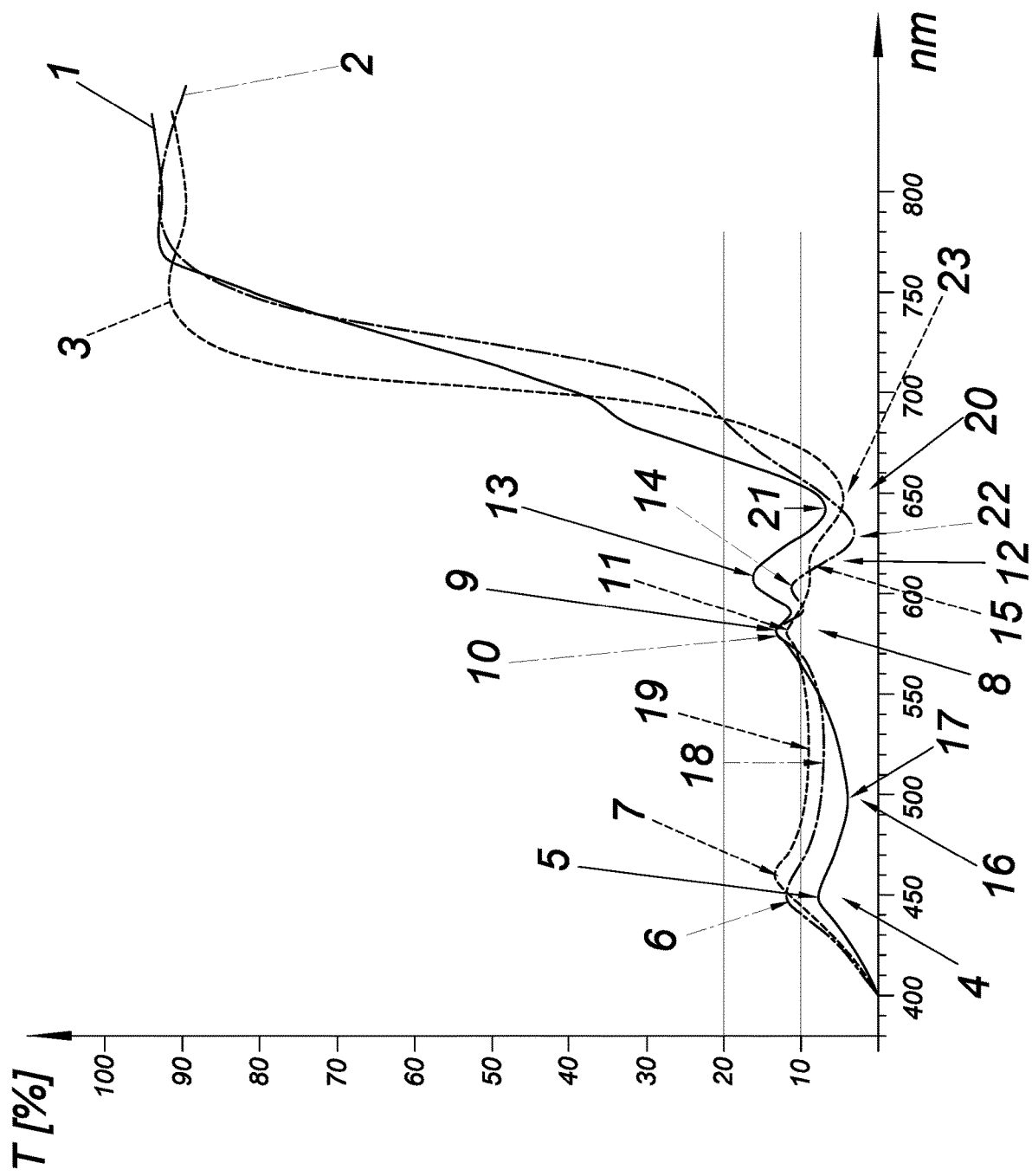

OPTICAL FILTER FOR SUNGLASSES

TECHNICAL FIELD

The system described herein relates to an optical filter for sunglasses, for example, having a transmittance of less than 20% for light wavelengths from 400 nm to 650 nm.

BACKGROUND OF THE INVENTION

Optical filters for sunglasses that have a transmittance of less than 20% for light wavelengths up to 650 nm, in particular for reducing UV light, which is harmful to the human eye, and for reducing light reflections which impair the vision, are known from the prior art. Since not only harmful UV light is filtered, but rather also other spectral colors are damped at such low transmittances in this light wavelength range, the problem exists that the color perception of the glasses' wearer, in particular the perception of color saturation and color temperature, is thus restricted. Not only does this restricted color perception have the result that the color tones observed through the filter are perceived as pale, but also appearances of fatigue occur in the glasses' wearer upon longer wearing of the glasses. This fatigue occurs as a result of the white compensation increasingly required by the chromatic adaptation of the eye. Sunglasses having such filters are therefore not suitable to be worn uninterrupted over a longer period of time.

Moreover, optical filters exist for sports glasses, in particular for ski glasses, which have an amplification of certain light wavelength ranges to improve the visual acuity and thus the reaction behavior of the wearer, and which have a damping of certain light wavelength ranges to enhance contrast. However, this amplification and damping has the disadvantage that color distortions occur because of the high breadths of variation and the high local rates of change of the transmittance curve. Because of the color distortions, a high chromatic adaptation of the eye is also necessary when wearing such sports glasses, which results in appearances of fatigue. Apart from this, such sports glasses filters may have transmittances of greater than 30%, sometimes even greater than 60% in the light wavelength range up to 650 nm and are accordingly not suitable for use in sunglasses, which are supposed to have a significantly lower transmittance.

SUMMARY OF THE INVENTION

It is desirable to have an optical filter of the type described above that, in spite of a good UV filter effect, an improved color perception is achieved overall and the fatigue-free wearing of the sunglasses is enabled even over a longer period of time.

The system described herein provides an optical fiber having the desired properties described above. In an embodiment of the system described herein, an optical filter of the type described in the Background section of this application is provided, but where the transmission spectrum includes a local transmission maximum in each of the light wavelength ranges between 440 nm and 470 nm and between 570 nm and 590 nm, and also includes a local transmission maximum or a transmission saddle point in the light wavelength range between 600 nm and 620 nm. In an embodiment, the transmittance below the connection line of the local transmission maximum between 440 nm and 470 nm and the local transmission maximum between 570 nm and 590 nm has an essentially convex overall curve with a breadth of variation less than 8%.

It has been shown that, due to the provision of a local transmission maximum in each case between 440 nm and 470 nm and also between 570 nm and 590 nm and a local transmission maximum or a transmission saddle point between 600 nm and 620 nm, a fresher color perception, in particular under daylight conditions, even at lower transmittances less than 20% may be achieved. The fresher color perception may be achieved because of the higher harmless blue, yellow, and orange/red components manifested in this transmission spectrum of the optical filter. An increase of the yellow component of the transmission spectrum due to raising the transmittance between 570 nm and 590 nm has heretofore been avoided since this results in principle in a loss of contrast between the red and green components of the transmission spectrum. Not only would people having a red-green visual impairment be disadvantaged by such loss of contrast, but the color saturation would thus be reduced overall.

To avoid the foregoing disadvantage, the transmittance of the optical filter according to embodiments of the system described herein has an essentially convex overall curve between 470 nm and 570 nm. In such embodiments, the transmittance curve may be located in this light wavelength range below the connection line of the local transmission maximum located in the blue range, and the local transmission maximum may be located in the yellow range of the transmission spectrum. These transmittance properties surprisingly have the result that the contrast between the red and green components is increased in spite of a higher yellow component. Because the convex overall curve of the transmittance between 470 nm and 570 nm has an essentially continuously positive curvature and a breadth of variation less than 8%, directly successive, varying transmittance changes may be avoided and thus a more uniform, distortion-free transmission behavior may be achieved. As a result, color distortions which negatively affect the color perception may be significantly reduced and the conditions for a better color adaptation may be provided. The chromatic adaptation of the eyes may be facilitated as a result of these features, whereby wearing sunglasses having filters according to embodiments of the system described herein can be performed without fatigue even over longer periods of time. Moreover, to further improve the color reproduction and/or perception, the transmittance up to the local transmission maximum between 440 nm and 470 nm in the blue range may have an essentially continuously rising, convex overall curve. For an even better contrast behavior, in particular in optical filters according to embodiments of the system described herein having gray, green, or brown tint, a further local transmission minimum may be provided between 625 nm and 655 nm.

To achieve a still higher contrast between the red and green components and further reduce color distortions, the essentially convex overall curve of the transmittance below the connecting line of the local transmission maximum between 440 nm and 470 nm and of the local transmission maximum between 570 nm and 590 nm may form precisely one transmission minimum.

Particularly favorable conditions may result in this context if the local transmission maximum between 440 nm and 470 nm has a transmittance between 5% and 15%, the local transmission minimum between 470 nm and 570 nm has a transmittance less than 10%, the local transmission maximum between 570 nm and 590 nm has a transmittance between 10% and 15%, and between 600 nm and 620 nm, the local transmission maximum has a transmittance between 10% and 20% or the transmission saddle point has a transmittance between 5% and 10%. Moreover, a local transmission minimum between 625 nm and 655 nm may have a transmittance less than 10%.

To enable high-quality manufacturing of the optical filters according to embodiments of the system described herein with high production speed and reproducibility, and to set up their transmission behavior in a particularly favorable manner, the optical filters may be manufactured from a plastic matrix in which between 400 and 700 ppm of a UV filter pigment, between 33 and 98 ppm of a blue pigment, between 75 and 96 ppm of a yellow pigment, between 124 and 174 ppm of a red pigment, and between 37 and 115 ppm of a green pigment are dispersed. Inorganic and/or organic pigments may be used in this case. The optical filters may be manufactured in the injection-molding method from a thermoplastic suitable for optical applications, for example, polycarbonate. The pigments accordingly may be admixed to the plastic granulate and the melt may be homogenized. Particularly favorable manufacturing conditions may be achieved, for example, if firstly premixes are prepared, wherein each premix has UV filter pigments and pigments of a specific color. The premixes of different colors thus obtained may be subsequently admixed sequentially with the plastic granulate.

BRIEF DESCRIPTION OF THE DRAWING

Embodiments of the subject matter of the system described herein are illustrated by way of example in the drawing, specifically on the basis of transmission spectra for optical filters each having different tint.

DESCRIPTION OF VARIOUS EMBODIMENTS

According to embodiments of the system described herein, optical filters—each having different tints—have transmission spectra 1, 2, and 3. In this case, the transmission spectrum 1, for example, describes the percentage curve of the transmittance T in the light wavelength range from 380 nm to 800 nm of an optical filter having brown tint according to embodiments of the system described herein. Accordingly, according to embodiments of the system described herein, the transmission spectrum 2 may be associated with an optical filter having gray tint, and the transmission spectrum 3 with an optical filter having green tint.

The transmission spectra 1, 2, and 3 each may have a local transmission maximum 5, 6, or 7, respectively, in the light wavelength range 4 between 440 nm and 470 nm, and each may have a local transmission maximum 9, 10, or 11, respectively, in the light wavelength range 8 between 570 nm and 590 nm. Moreover, in the light wavelength range 12 between 600 nm and 620 nm, the transmission spectra 1 and 2 may have a local transmission maximum 13 or 14, respectively, while the transmission spectrum 3 may include a transmission saddle point 15 in the light wave range 12 therein.

As can be seen in the drawing, the transmittances of the transmission spectra 1, 2, and 3 may have an essentially convex overall curve 16 with a breadth of variation less than 8% between the transmission maximum 5, 6, and 7 in the light wave range 4 and the transmission maximum 9, 10, and 11 in the light wave range 8. In this case, the convex overall curve 16 of the transmission spectra 1, 2, and 3 each may form precisely one transmission minimum 17, 18, or 19, respectively, in the light wavelength range therein between 470 nm and 570 nm.

According to an embodiment, the transmission spectra 1, 2, and 3 can comprise transmission minima 21, 22, and 23, respectively, in the light wave range 20 between 625 nm and 655 nm.

The transmission maximum 5 of the transmission spectrum 1 may be 7-9%, the transmission minimum 17 may be 4-6%, the transmission maximum 9 may be 12-14%, the transmission maximum 13 may be 15-17%, and the transmission minimum 21 may be 7-9%.

The transmission maximum 6 of the transmission spectrum 2 may be 11-13%, the transmission minimum 18 may be 7-9%, the transmission maximum 10 may be 12-14%, the transmission maximum 14 may be 10-12%, and the transmission minimum 22 may be 3-5%.

The transmission maximum 7 of the transmission spectrum 3 may be 12-14%, the transmission minimum 19 may be 8.5-9.5%, the transmission maximum 11 may be 11-13%, the transmission saddle point 15 may be 8-9%, and the transmission minimum 23 may be 4-6%.

The features of the system described herein disclosed in the present description, in the drawings and in the claims may be essential for the realization of the system described herein in the various embodiments thereof, both individually and in arbitrary combinations. The system described herein is not restricted to the described embodiments. It may be varied within the scope of the claims, taking into account the knowledge of the relevant person skilled in the art. Other embodiments of the system described herein will be apparent to those skilled in the art from a consideration of the specification and/or an attempt to put into practice the system described herein disclosed herein. It is intended that the specification and examples be considered as illustrative only, with the true scope and spirit of the invention being indicated by the following claims.

The invention claimed is:

1. An optical filter for sunglasses, having a transmittance of less than 20% for light wavelengths from 400 nm to 650 nm, wherein a transmission spectrum comprises a local transmission maximum in each of the light wavelength ranges between 440 nm and 470 nm and between 570 nm and 590 nm and a local transmission maximum or a transmission saddle point in the light wavelength range between 600 nm and 620 nm, wherein a transmittance below a connecting line of the local transmission maximum between 440 nm and 470 nm and the local transmission maximum between 570 nm and 590 nm has an essentially convex overall curve with a breadth of variation less than 8%.

2. The optical filter according to claim 1, wherein the essentially convex overall curve of the transmittance below the connecting line of the local transmission maximum between 440 nm and 470 nm and the local transmission maximum between 570 nm and 590 nm forms precisely one transmission minimum.

3. The optical filter according to claim 1, wherein the local transmission maximum between 440 nm and 470 nm has a transmittance between 5% and 15%, the local transmission minimum between 470 nm and 570 nm has a transmittance less than 10%, the local transmission maximum between 570 nm and 590 nm has a transmittance between 10% and 15%, and between 600 nm and 620 nm, the local transmission maximum has a transmittance between 10% and 20% or the transmission saddle point has a transmittance between 5% and 10%.

4. The optical filter according to claim 1, made from a plastic matrix, in which between 400 and 700 ppm of a UV filter pigment, between 33 and 98 ppm of a blue pigment, between 75 and 96 ppm of a yellow pigment, between 124 and 174 ppm of a red pigment, and between 37 and 115 ppm of a green pigment are dispersed.

5. An optical filter for sunglasses, having a transmittance of less than 20% for light wavelengths from 400 nm to 650 nm, wherein a transmission spectrum of the optical filter comprises:
   a first local transmission maximum in a light wavelength range between 440 nm and 470 nm;
   a second local transmission maximum in a light wavelength range between 570 nm and 590 nm; and
   a third local transmission maximum or a transmission saddle point in the light wavelength range between 600 nm and 620 nm,
   wherein a transmittance below a connecting line of the first local transmission maximum and the second local transmission maximum has an essentially convex overall curve.

6. The optical filter of claim 5, wherein the transmittance below the connecting line has a breadth of variation less than 8%.

7. The optical filter according to claim 5, wherein the essentially convex overall curve of the transmittance below the connecting line forms precisely one transmission minimum.

8. The optical filter according to claim 5, wherein:
   the first local transmission maximum has a transmittance between 5% and 15%,
   a local transmission minimum between 470 nm and 570 nm has a transmittance less than 10%,
   the second local transmission maximum has a transmittance between 10% and 15%, and
   between 600 nm and 620 nm, the third local transmission maximum has a transmittance between 10% and 20% or the transmission saddle point has a transmittance between 5% and 10%.

9. The optical filter according to claim 5, made from a plastic matrix, in which between 400 and 700 ppm of a UV filter pigment, between 33 and 98 ppm of a blue pigment, between 75 and 96 ppm of a yellow pigment, between 124 and 174 ppm of a red pigment, and between 37 and 115 ppm of a green pigment are dispersed.

10. A method of making an optical filter for sunglasses, the optical fiber having a transmittance of less than 20% for light wavelengths from 400 nm to 650 nm and a transmission spectrum of the optical filter having a first local transmission maximum in a light wavelength range between 440 nm and 470 nm, a second local transmission maximum in a light wavelength range between 570 nm and 590 nm and a third local transmission maximum or a transmission saddle point in the light wavelength range between 600 nm and 620 nm, the method comprising:
   forming a plastic matrix, including admixing pigments into a thermoplastic, the pigments including between 400 and 700 ppm of a UV filter pigment, between 33 and 98 ppm of a blue pigment, between 75 and 96 ppm of a yellow pigment, between 124 and 174 ppm of a red pigment, and between 37 and 115 ppm of a green pigment.

11. The method according to claim 10, wherein forming the plastic matrix includes:
   applying injection molding to the thermoplastic.

12. The method according to claim 10, wherein forming the plastic matrix includes:
   homogenizing the thermoplastic admixed with the pigments.

13. The method according to claim 10, wherein, prior to admixing the pigments and the thermoplastic, a plurality of premixes are prepared, each premix including a portion of the UV filter pigment and part of at least one of the blue pigment, yellow pigment, red pigment or green pigment.

14. The method according to claim 10, wherein a transmittance below a connecting line of the first transmission maximum and the second local transmission maximum has an essentially convex overall curve.

15. The method according to claim 14, wherein the transmittance below the connecting line has a breadth of variation less than 8%.

16. The method according to claim 10, wherein the essentially convex overall curve of the transmittance below the connecting line forms precisely one transmission minimum.

17. The method according to claim 10, wherein:
   the first local transmission maximum has a transmittance between 5% and 15%,
   a local transmission minimum between 470 nm and 570 nm has a transmittance less than 10%,
   the second local transmission maximum has a transmittance between 10% and 15%, and
   between 600 nm and 620 nm, the third local transmission maximum has a transmittance between 10% and 20% or the transmission saddle point has a transmittance between 5% and 10%.

* * * * *